United States Patent [19]

Nixon

[11] Patent Number: 4,572,109

[45] Date of Patent: Feb. 25, 1986

[54] ANIMAL SEPARATOR GATE

[76] Inventor: Edward T. Nixon, Rte. 3, Box 62A, Ninety-Six, S.C. 29666

[21] Appl. No.: 641,312

[22] Filed: Aug. 16, 1984

[51] Int. Cl.⁴ ............................................. A01K 29/00
[52] U.S. Cl. ...................................... 119/155; 49/169
[58] Field of Search ......................... 119/99, 155, 157; 49/168, 169

[56] References Cited

U.S. PATENT DOCUMENTS

| | | | |
|---|---|---|---|
| 995,338 | 6/1911 | Folsom | 49/168 |
| 1,028,588 | 6/1912 | Mitchell | 49/169 |
| 1,250,648 | 12/1917 | Pierce | 49/169 |
| 2,144,896 | 1/1939 | Raymond | 119/155 |
| 2,803,074 | 8/1957 | Brokish | 49/169 |
| 2,972,825 | 2/1961 | Stillwell et al. | |
| 3,072,100 | 1/1963 | Dustin | 119/155 |
| 3,861,359 | 1/1975 | Pals | 119/155 |

*Primary Examiner*—Robert P. Swiatek
*Attorney, Agent, or Firm*—Kilpatrick & Cody

[57] ABSTRACT

An animal separator or sorting gate which includes a main door within a jamb. The main door is separated into upper and lower portions by a horizontal bar. The lower portion of the main door is divided into openings by a number of vertical separator bars, and is also covered by a horizontally swinging small animal admittance door or sliding comb, and by an adjustable animal height selection bar that may be raised or lowered. Small animals may be allowed to pass through the gate when the height selection bar is lowered and the small animal admittance door or comb is opened. Larger animals may be allowed through when the height selection bar is raised. The vertical animal separator bars of the main door prevent animals attempting to pass through the gate from bunching up toward the remaining open gap between the main door frame and the small animal admittance door when the operator of the gate is closing the small animal admittance door. This structure provides a gate which may be quickly operated with a minimum of manpower and which allows quick separation of animals by both height and width.

15 Claims, 8 Drawing Figures

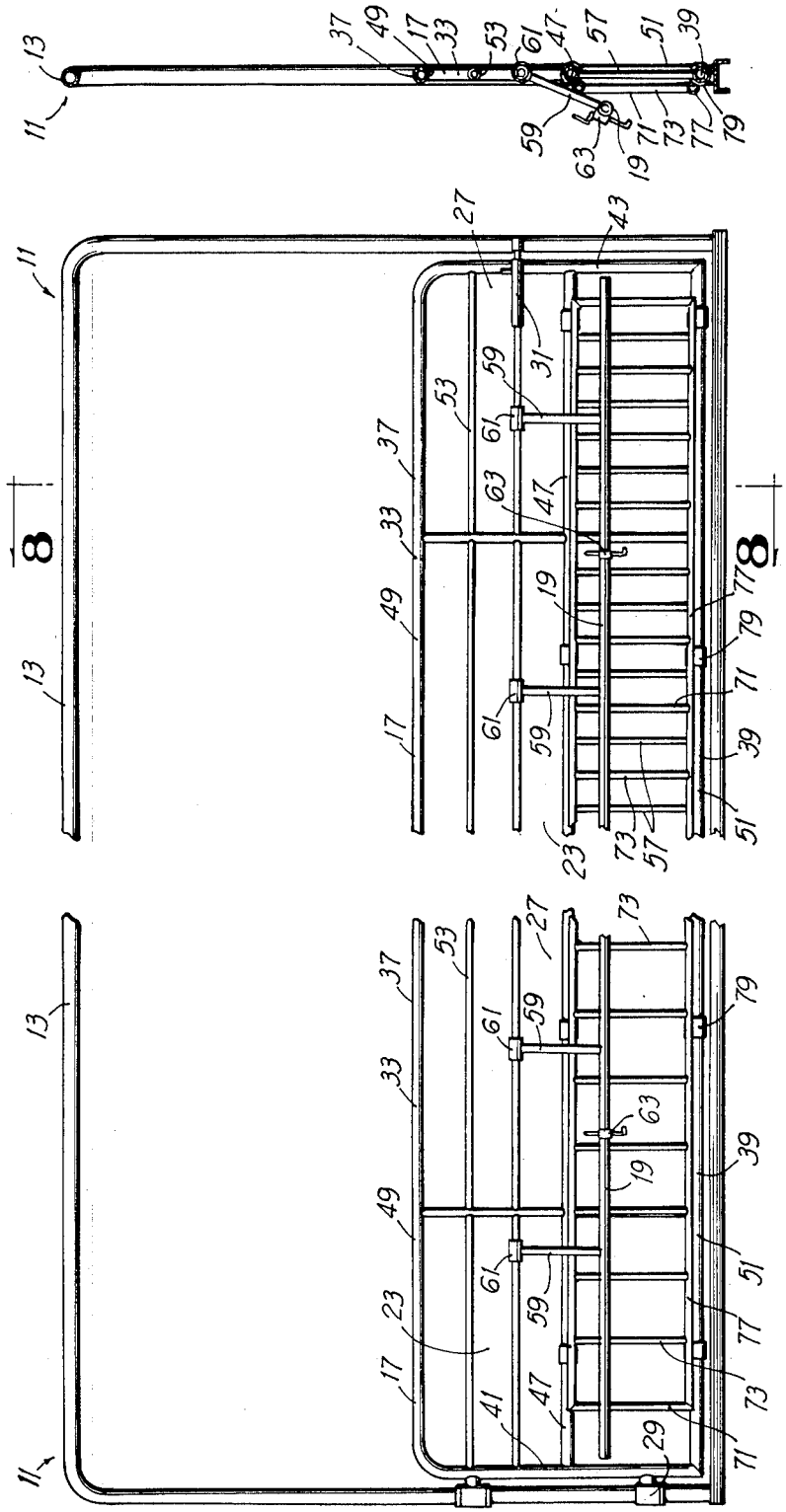

ANIMAL SEPARATOR GATE

BACKGROUND OF THE INVENTION

This invention relates to an animal separating or sorting gate which may be operated with a minimum of people, which allows the operator to vary the sizes of animals being separated from one another and which is quickly adjusted and operated.

A farmer or rancher frequently desires to separate different sizes of animals from one another, such as calves from their mothers or hogs of a certain weight from hogs of another weight for marketing. In the past, some farmers have manually separated such animals by sorting through the herd and weighing the animals which appeared to be of proper size before removing them.

Another approach has been to arrange an adjustable gate between two pens or stockades. The animals to be separated are located in one pen and an incentive such as food is located in the other. The gate is operated allowing either large animals or small animals to pass through the gate to reach the food.

One such approach, forming an opening in such a gate which will allow small animals to pass but which stops large animals, by using sliding members in the gate is disclosed in U.S. Pat. No. 2,803,074, issued Aug. 20, 1957, to Brokish ("Brokish"), U.S. Pat. No. 2,972,825, issued Feb. 28, 1961 to Stillwell, et al. ("Stillwell, et al."), U.S. Pat. No. 3,072,100, issued Jan. 8, 1963, to Dustin ("Dustin"), and U.S. Pat. No. 3,861,359, issued Jan. 21, 1975, to Pals ("Pals"). Brokish discloses a gate with a door having an opening through which small animals may pass. A sliding structure adjustably closes off the opening to allow varying sizes of animals to pass through the gate. Although the Brokish gate may be easily operated by one person, the opening appears to allow only one or a limited number of animals to pass through the gate at one time so that the sorting process may be lengthy. The Stillwell, et al., gate also has an opening adjustably covered by a sliding structure and also appears to allow only a limited number of animals to pass through the gate at one time.

The Dustin gate has more than one opening covered by sliding structures, and thus would appear to allow completion of the animal separating process in a shorter period of time than the Brokish and Stillwell, et al., gates. The sliding structures of the Dustin gate, however, are operated by a crank mechanism which may take longer to operate than a sliding structure held in place by pins such as in Brokish. Further, because the sliding structures cannot be moved quickly with the crank mechanism, animals may become stuck and possibly injured in the gate as the sliding structures are being opened or closed and the animals attempt to force their way through the openings.

The Pals gate has a single opening adjustably covered by a sliding structure, and that structure is also controlled by a crank mechanism as in the Dustin gate. However, Pals also discloses a vertically swinging rectangular door that swings from the top of the opening and partially covers it. The door swings in the direction in which the animals pass so that they may push the door out of the way when they pass through the gate to the food or other incentive, but cannot push the door in the other direction if they attempt to pass back through the gate. Thus, although the animal sorting process may be a lengthy one with a Pals gate because it has only one opening, that gate does include a means for separating animals both by height and weight simultaneously.

A second general approach to the use of gates to separate animals by size is to include one or more doors for covering the opening through which the smaller or larger animals may pass, rather than sliding members. U.S. Pat. No. 995,338, issued June 13, 1911, to Folsom ("Folsom"), for instance, discloses a gate having a door with an upper part and a lower part, either part being independently swingable. The lower part may be swung open to let small animals pass through the gate, and the upper part may be swung open with the lower part closed to allow larger animals, which can step over the closed lower part, to pass through the gate. The upper part is also slidably vertically adjustable so that an opening can be formed between the upper and lower parts to allow animals to pass through the gate which can step over the lower part while simultaneously ducking the raised upper part. U.S. Pat. No. 2,144,896, issued Jan. 24, 1939, to Raymond ("Raymond") also discloses a gate with a door having an upper part and a lower part. In the Raymond gate, however, the lower part swings vertically about its upper horizontal edge.

The Folsom and Raymond gates both allow larger numbers of animals simultaneously to pass through their openings than the gates mentioned above. However, they may require extra manpower to close the swinging portions when it is desired to halt the separating process. This difficulty occurs because when the animals perceive the swinging members being closed, they will head for the remaining gap left open and thus bunch up at that end of the swinging portion and apply pressure against it, making the gate difficult to close.

SUMMARY OF THE INVENTION

The present invention addresses the problems presented by the above-described earlier gates by providing a gate that is quickly operated, that allows allow quick separation of animals, that may be operated with a minimum of manpower, and that allows adjustable separation of animals.

The gate of the present invention includes a main door within a jamb. The main door is separated into upper and lower portions by a horizontal bar. The lower portion of the main door is divided into openings by a number of vertical separator bars. The lower portion of the main door is also covered by a horizontally swinging small animal admittance door, and by an adjustable animal height selection bar that may be raised or lowered.

Very small animals may be allowed to pass through the gate when the height selection bar is lowered and the small animal admittance door is opened. Larger animals may be allowed through when the height selection bar is raised.

When the operator chooses to halt the separation process, he pushes the small animal admittance door back to its closed position. Importantly, the vertical animal separator bars of the main door prevent the animals attempting to pass through the gate from bunching toward the remaining opened gap between the main door frame and the small animal admittance door while the small animal admittance door is being closed. This is because once an animal enters the gate, it is prevented from moving laterally by the vertical animal separator bars. Thus, in this gate, unlike earlier ones, the operator is spared the effort of closing the small animal admittance door against a herd of animals attempting to pass through the the gap in the gate between that door and the main frame as it is being closed.

The gate of the present invention also allows a large number of animals to be separated at one time through a large opening in the door, without the need for a crank mechanism to set adjustably yet firmly the size of the openings in the door. Thus, the gate of the present invention may be quickly operated by the operator and it avoids possible injury to the animals which may result from the slow movement of sliding members operated by crank mechanisms in combination with the tendency of the animals to crowd through the openings as they are becoming larger or smaller.

It is thus an object of the present invention to provide an animal separator gate that may be quickly operated and that allows quick separation of smaller animals from larger ones.

It is a further object of the present invention to provide an animal separator gate that allows separation of animals both by height and width.

It is a further object of the present invention to provide an animal separator gate that may be operated with a minimum of manpower.

It is an additional object of the present invention to provide an animal separator gate that is easily constructed and that may be manufactured inexpensively.

Other objects, features and advantages of the present invention will become apparent with reference to the remainder of the specification and the claims and drawings hereof.

BRIEF DESCRIPTION OF THE DRAWINGS

FIG. 6 is a front elevational view of a third embodiment of a gate of the present invention using a separator comb in place of a small animal admittance door.

FIG. 7 is a front elevational view of a portion of the gate of FIG. 6 with the separator comb in the closed position.

FIG. 8 is a side elevational view of the gate of FIG. 6.

DETAILED DESCRIPTION OF THE DRAWINGS

Figure 1:
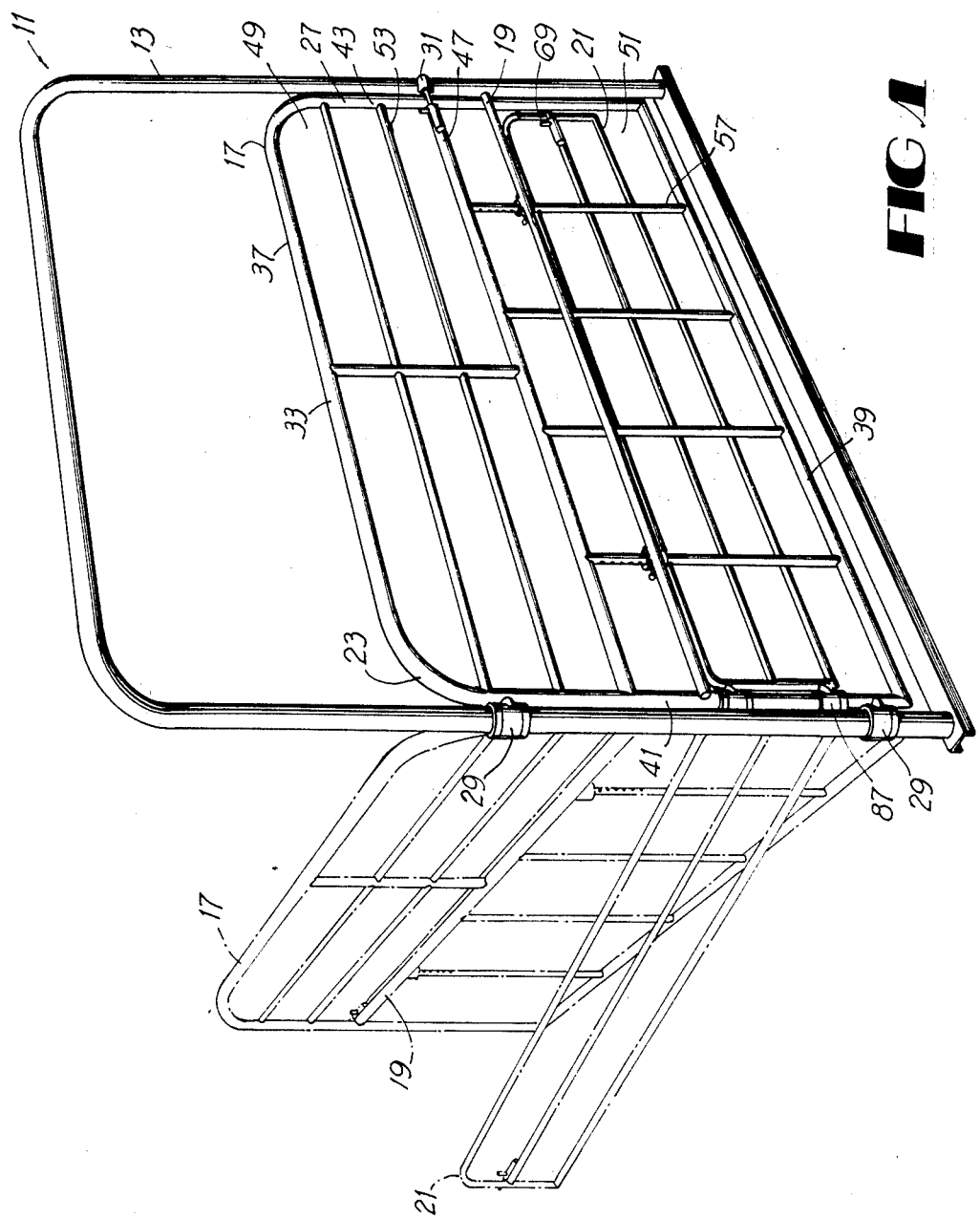
FIG. 1 is a perspective view of one embodiment of a gate of the present invention.

FIG. 1 is a perspective view of a preferred embodiment of separator gate 11 of the present invention. Gate 11 comprises generally a jamb 13, a main door 17, a horizontal animal height selection bar 19 and a small animal admittance door 21. As shown in relief in FIG. 1, main door 17 swings within jamb 13 and small animal admittance door 21 swings within main door 17.

Jamb 13, main door 17, horizontal animal selection bar 19 and small animal admittance door 21, and components of them may be made of any convenient material such as wood or metal. In the preferred embodiment, these members are made of metal pipe that may be easily welded.

Main door 17 comprises a frame and structural members within the frame. For reference herein and to distinguish one portion of the gate from another, main door 17 may be considered to comprise a left portion 23 and a right portion 27, which portions are defined with reference to the viewer of the drawings herein. As an example, left portion 23 of main door 17 in FIG. 1 is that portion of main door 17 which is mounted to jamb 13 by hinges 29. Similarly, right portion 27 of main door 17 is that portion of main door 17 which may be connected to the other side of jamb 13 by fastener 31. Of course, "left" and "right" herein are for purposes of convention only, and hinges 29 may be located on right portion 27 of main door, and fastener 31 on left portion 23, as well, for example.

Forming the periphery of main door 17 is main door frame 33. Main door frame 33 comprises an upper portion 37, a lower portion 39, a left portion 41 and a right portion 43. Main door frame 33 is hingably connected to jamb 13 by hinges 29. Hinges 29 may be any conventional type hinge and in the preferred embodiment they are cuffs which encircle jamb 13 so that main door 17 can swing.

Main door frame 33 is also connected to jamb 13 by a fastener 31 which may be a conventional latch such as a spring-loaded latch, a sliding and rotating latch or other conventional type mechanism. In the preferred embodiment, fastener 31 is a spring-loaded pin that slides into a corresponding hole in jamb 13.

The central structural member of main door 17 is horizontal bar 47 which extends from left portion 41 to right portion 43 of main door frame 33. Horizontal bar 47 divides main door 17 into an upper portion 49 and a lower portion 51.

Upper portion 49 of main door 17 serves to prevent larger animals from passing through gate 11 when main door 17 is closed. Upper portion 49 may contain structural members 53 that may extend from left portion 41 of frame 33 to right portion 43 of frame 33. One or more such structural members may be included. These structural members may be horizontally and vertically oriented within upper portion 49 or they may be diagonal. Diagonal structural members 53 serve to divide upper portion 49 into triangular trussed sections that increase the strength of main door 17.

It is lower portion 51 of main door 17 which allows animal separation. Lower portion 51 of main door 17, unlike in previous gates which use swinging doors to separate animals, incorporates a plurality of vertical animal separator bars 57. Vertical animal separator bars 57 extend from horizontal bar 47 to lower portion 51 of main door frame 33. They serve to force animals to stay apart when passing through gate 11, rather than bunching up and passing through one side or other of lower portion 51 of main door 17. Vertical animal separator bars may be spaced apart at any appropriate width, corresponding to the particular type and animal size contemplated. For instance, they may be spaced farther apart for a pig sorting application than for a cattle sorting application. Vertical animal separator bars 57 may be adjustably spaceable within lower portion 51, by having cuffs at either end which are slidable on horizontal bar 47 and lower portion 39 of frame 33, and held in place by a key or thumb bolt or similar fitting.

Figure 4:
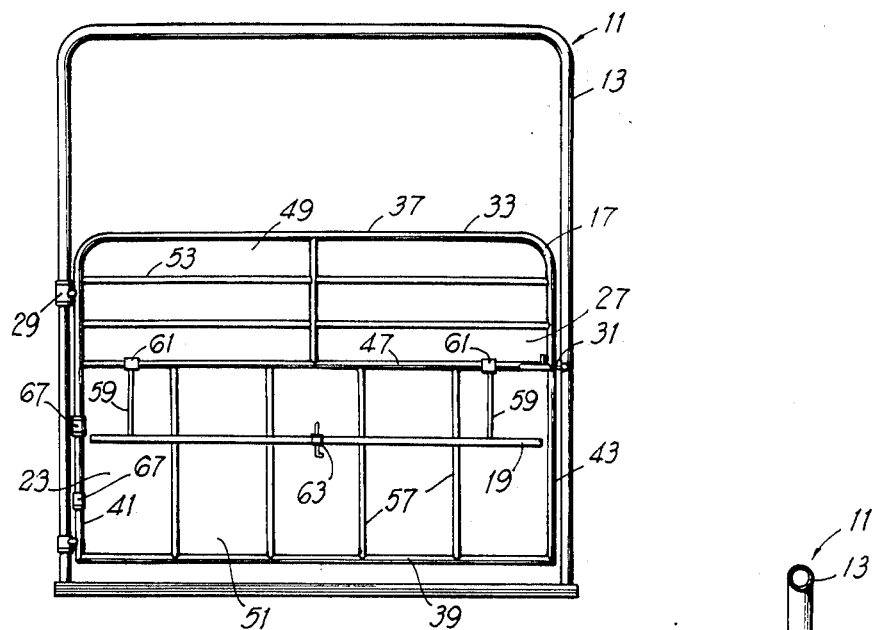
FIG. 4 is a front elevational view of a second embodiment of a gate of the present invention, with the small animal admittance door open and the animal height selection bar, mounted on rotating arms, in the upward position.
Figure 5:
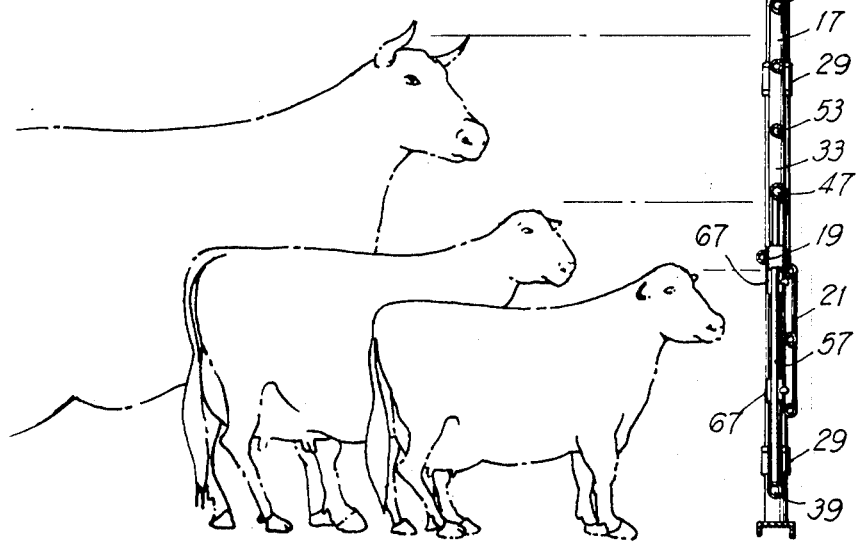
FIG. 5 is a side elevational view of the gate of FIG. 1 with the small animal admittance door in the closed position.

Corresponding to the width separating function of vertical animal separator bars 57 is the height separating function of horizontal animal selection bar 19. Horizontal animal selection bar 19 may be attached to two or more vertical animal separator bars 57 by cuffs locked in place by pins as shown in FIG. 1, or by other appropriate similar means. These cuffs allow horizontal animal selection bar 19 to be adjustably lowered or raised and locked in place so that gate 11 may be arranged to sort animals of a particular height from the herd. Horizontal animal selection bar 19 may also be connected to main door 17 as shown in FIG. 4 by a plurality of arms 59 to which cuffs 61 are attached. Cuffs 61 are rotatably mounted on horizontal bar 47 or structural member 53 to allow horizontal animal separator bar 19 to rotate into an upward or downward position. A fastener or fasteners 63 may be attached to horizontal animal selection bar 19 to lock it into place, if desired, although horizontal animal selection bar 19 may be held in place in the downward position simply by pressure applied by the animals on horizontal animal selection bar 19 against vertical animal separator bars 57. Such a fastener, which may be similar to fastener 31 which attaches main door 17 to jamb 13, may be useful in retaining horizontal animal selection bar 19 in the upward position.

Hingably mounted to close across vertical animal separator bars 57 is small animal admittance door 21. Small animal admittance door 21 extends from the left portion 23 of main door 17 to right portion 27. (As mentioned above, it may just as easily be considered to extend from right portion 27 to left portion 23.) It is mounted by hinges 67 on left portion 41 or right portion 43 of frame 33, so that small animal admittance door 21 swings within main door 17. Small animal admittance door 21 is stopped from swinging by vertical vertical animal separator bars 57. Hinges 67 may be of material similar to hinges 29 which connect main door 17 to jamb 13 of gate 11.

A fastener 69 may be mounted on small animal admittance door 21 to secure it to right portion 43 of frame 33. Fastener 69 may be similar to the fastener 31 used to connect main door 17 to jamb 13.

Figure 2:
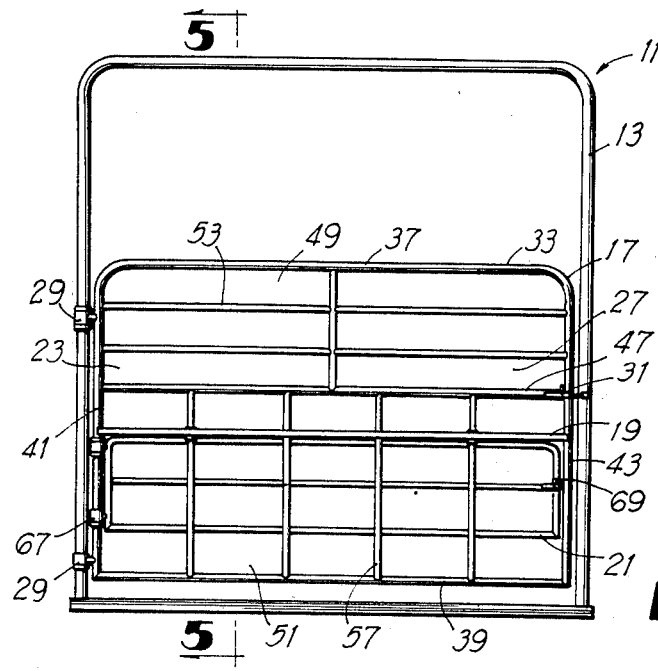
FIG. 2 is a front elevational view of the gate of FIG. 1 with the small animal admittance door in the closed position and the animal height selection bar in the downward position.
Figure 3:
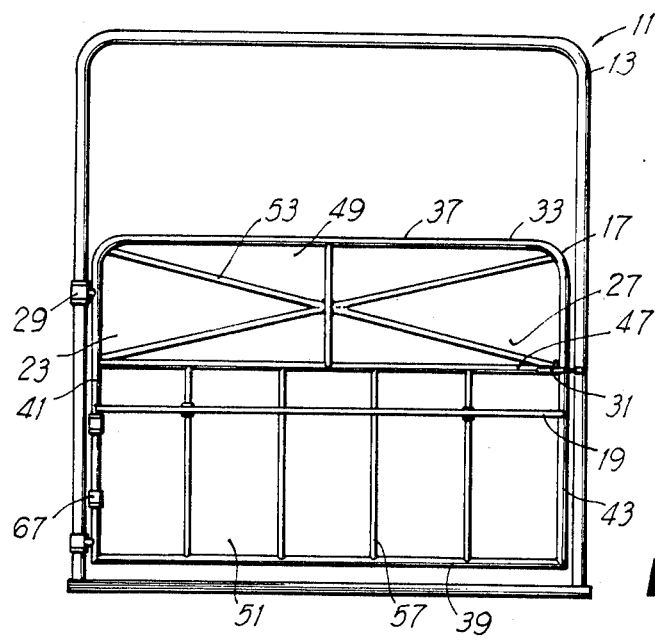
FIG. 3 is a front elevational view of the gate of FIG. 1 with the small animal admittance door open and the height selection bar in the downward position.

FIG. 1 shows how main door 17, horizontal animal selection bar 19 and small animal admittance door 21 cooperate to allow animals to be sorted with gate 11. FIGS. 2, 3 and 4 are also of assistance in this regard.

In the first mode, small animal admittance door 21 and main door 17 are closed so that no animals may pass through the gate. In a second mode, small animal admittance door 21 and main door 17 are open as shown in relief in FIG. 1 so that all animals may pass through the gate. Of course, small animal admittance door 21 need not be opened when main door 17 is opened.

In a third mode, used to separate out small animals from the herd, as shown in FIG. 3, small animal admittance door 21 is opened, main door 17 is closed and horizontal animal selection bar 19 is in the lowered position. Small animals may then pass through the gate 11 to reach the incentive such as food encouraging them to pass through the gate 11. In a fourth mode, as shown in FIG. 1 in relief, small animal admittance door 21 is open while horizontal animal selection bar 19 is in the upward position to allow medium sized animals to pass through gate 11. Where horizontal animal selection bar 19 is adjustable in height as shown in FIG. 1, intermediate modes may be selected between modes three and four to allow animals of varying heights to be separated out from the herd.

Important in the present invention is the ease with which small animal admittance door 21 may be closed. The operator simply brings it around toward main door 17. Animals are not permitted to bunch up toward the gap remaining between main door 17 and small animal admittance door 21, because vertical animal separator bars 57 prevent them from moving in that direction while within gate 11. Thus, small animal admittance door 21 may be closed with greater ease in the gate of the present invention than corresponding doors in earlier gates.

FIGS. 6-8 show another embodiment of a gate 11 of the present invention. In this embodiment, a separator comb 71 is slidably mounted on horizontal bar 47 and lower portion 39 of frame 33. Uprights 73 in comb 71 correspond in spacing to vertical animal separator bars 57 in main door 17. These uprights 73 extend between two runners 77 that are spaced approximately the distance between horizontal bar 47 and lower portion 39 of main door frame 33. Runners 77 may be slidably mounted on these members by cuffs 79 extending around these members. When the comb 71 is slid to the open position, as shown in FIG. 6, animals may be permitted to pass. In the closed position, as shown in FIG. 7, animals are prevented from passing. Comb 71 may be used in connection with a horizontal animal selection bar 19 as described in connection with the preferred embodiment. This embodiment of gate 11 is also easily operated because animals may not bunch up when comb 71 is slid to the closed position.

This description is given for purposes of illustration and explanation. It will be apparent to those skilled in the relevant art that modifications and changes may be made to the invention as described above without departing from its scope and spirit.

I claim:

1. A gate for sorting animals, comprising:
   (a) a jamb;
   (b) a main door which swings within the jamb, comprising:
      (i) a main door frame forming the periphery of the main door;
      (ii) a horizontal bar extending between the left portion of the main door frame and the right portion of the main door frame;
      (iii) a plurality of vertical animal separator bars extending from the horizontal bar to the lower portion of the main door frame;
      (iv) at least one hinge connected to the main door frame and the jamb; and
      (v) at least one fastener for connecting the main door frame to the jamb to prevent the main door from swinging;
   (c) a horizontal animal height selection bar adjustably mounted on the main door; and
   (d) a small animal door which swings within the main door, comprising:
      (i) a small amimal admittance door frame forming the periphery of the small animal admittance door;
      (ii) at least one hinge connected to the small animal admittance door frame and to the main door frame below the horizontal bar of the main door frame; and
      (iii) at least one fastener attached to the small animal admittance door frame for connecting the small animal admittance door frame to the main door frame to prevent the small animal admittance door from swinging.

2. The gate of claim 1 further comprising at least one structural member extending between the left and right portions of the main door frame, above said horizontal bar.

3. The gate of claim 2 wherein said structural member is diagonally oriented in said main door frame.

4. The gate of claim 2 wherein said structural member is horizontally oriented in said main door frame.

5. The gate of claim 2 further comprising at least one structural member extending between the left and right portions of the small animal admittance door frame.

6. The gate of claim 5 wherein said structural member is diagonally oriented in said small animal admittance door frame.

7. The gate of claim 5 wherein said structural member is horizontally oriented in said small animal admittance door frame.

8. The gate of claim 1 wherein said horizontal animal height selection bar is slidably mounted to a plurality of said vertical animal separator bars, and held in place by holding means.

9. The gate of claim 1 wherein said horizontal animal height selection bar is slidably mounted to said left and said right portions of said main door frame, and held in place by pins.

10. The gate of claim 1 wherein said horizontal animal height selection bar is rotatably mounted to said horizontal bar of said main door frame, and further comprises:
(a) a horizontal animal height selection bar member;
(b) a plurality of arms connected to the horizontal animal height selection bar member;
(c) a plurality of cuffs, each rotatably mounted on said horizontal bar of said main door frame and connected to one of the arms; and
(d) at least one fastener mounted on the horizontal animal height selection bar member for fastening that member to a portion of the main door.

11. A gate for sorting animals, comprising:
(a) a jamb;
(b) a main door which swings within the jamb, comprising:
(i) a main door frame forming the periphery of the main door;
(ii) a horizontal bar extending between the left portion of the main door frame and the right portion of the main door frame;
(iii) a plurality of vertical animal separator bars extending from the horizontal bar to the lower portion of the main door frame;
(iv) at least one hinge connected to the main door frame and the jamb; and
(v) at least one fastener for connecting the main door frame to the jamb to prevent the main door frame from swinging;
(c) a horizontal animal height selection bar adjustably mounted on the main door; and
(d) a small animal admittance comb which slides within the lower portion of the main door, comprising:
(i) a pair of runners spaced apart a distance corresponding to the distance between the horizontal bar and the lower portion of the main door frame;
(ii) a plurality of uprights connecting the runners and spaced apart a distance corresponding to the distance between the vertical animal separator bars of the main door; and
(iii) a plurality of cuffs slidably connecting the runners to the horizontal bar and the lower portion of the main door frame.

12. The gate of claim 11 further comprising at least one structural member extending between said left and right portions of said main door frame above said horizontal bar.

13. The gate of claim 12 wherein said structural member is diagonally oriented in said main door frame.

14. The gate of claim 12 wherein said structural member is horizontally oriented in said main door frame.

15. The gate of claim 11 wherein said horizontal animal height selection bar is rotatably mounted to at least one of said structural members of said main door frame, and further comprises:
(a) a horizontal animal height selection bar member;
(b) a plurality of arms connected to the horizontal animal height selection bar member;
(c) a plurality of cuffs, each rotatably mounted on said structural member of said main door frame and connected to one of the arms; and
(d) at least one fastener mounted on the horizontal animal height selection bar member for fastening that member to a portion of the main door.

* * * * *